United States Patent [19]
Cloutier

[11] Patent Number: 6,064,332
[45] Date of Patent: May 16, 2000

[54] PROPORTIONAL GUIDANCE (PROGUIDE) AND AUGMENTED PROPORTIONAL GUIDANCE (AUGMENTED PROGUIDE)

[75] Inventor: James R. Cloutier, Niceville, Fla.

[73] Assignee: The United States of America as represented by the Secretary of the Air Force, Washington, D.C.

[21] Appl. No.: 08/233,588

[22] Filed: Apr. 26, 1994

[51] Int. Cl.[7] .............................. G01C 13/72; F41G 7/36
[52] U.S. Cl. ..................... 342/62; 244/3.14; 244/3.19; 701/1; 701/4
[58] Field of Search .............................. 342/62; 244/3.14, 244/3.19; 701/1, 2, 3, 4, 11, 200, 201, 202, 205, 207, 209, 210, 220, 221, 224

[56] References Cited

U.S. PATENT DOCUMENTS

| | | | |
|---|---|---|---|
| 3,782,667 | 1/1974 | Miller, Jr. et al. | 244/3.13 |
| 3,897,918 | 8/1975 | Gulick, Jr. et al. | 244/3.19 |
| 4,162,775 | 7/1979 | Voles | 244/3.17 |
| 4,383,662 | 5/1983 | Alongi et al. | 244/3.15 |
| 4,402,250 | 9/1983 | Baasch | 89/41 AA |
| 4,542,870 | 9/1985 | Howell | 244/3.15 |
| 4,568,823 | 2/1986 | Diehl et al. | 235/404 |
| 4,719,584 | 1/1988 | Rue et al. | 364/516 |
| 4,760,397 | 7/1988 | Piccolruaz | 342/75 |
| 4,825,055 | 4/1989 | Pollock | 235/411 |
| 4,959,800 | 9/1990 | Woolley | 364/516 |
| 4,980,690 | 12/1990 | Fiden | 342/62 |
| 4,993,662 | 2/1991 | Barnes et al. | 244/3.17 |
| 5,035,375 | 7/1991 | Friedenthal et al. | 244/3.12 |
| 5,062,056 | 10/1991 | Lo et al. | 364/516 |
| 5,168,277 | 12/1992 | Lapinta et al. | 342/77 |
| 5,341,142 | 8/1994 | Reis et al. | 342/62 |
| 5,529,262 | 1/1974 | Horwath | 244/3.16 |

OTHER PUBLICATIONS

Yuan, C. L., "Homing and Navigation Courses of Automatic Target–Seeking Devices," Journal of Applied Physics, vol. 19, Dec. 1948, pp. 1122–1128.

Fossier, M. W., "The Development of Radar Homing Missiles," Journal of Guidance, Control, and Dynamics, vol. 7, Nov.–Dec. 1984, pp. 641–651.

Riggs, T. L. and Vergez, P. L., "Advanced Air–to–Air Missile Guidance Using Optimal Control and Estimation," USAF Armament Laboratory, AFATL–TR–81–52, Jun. 1981.

Zarchan, P., *Tactical and Strategic Missile Guidance*, vol. 124, Progress in Astronautics and Aeronautics, Published by the American Institute of Aeronautics and Astronautics, Inc., Washington D.C.

*Primary Examiner*—John B. Sotomayor
*Attorney, Agent, or Firm*—Bernard E. Franz; Thomas L. Kundert

[57] ABSTRACT

Two new homing guidance laws, designated as proportional Guidance (PROGUIDE) and Augmented Proportional Guidance (Augmented PROGUIDE), have been developed for use against non-maneuvering and maneuvering targets, respectively. These guidance laws are the solutions of linear-quadratic regulator control problems and minimize deviations from the collision triangle over the entire period of homing flight, thereby indirectly minimizing miss distance. In contrast to proportional navigation (PRONAV), these algorithms command the achievement of angular acceleration instead of linear acceleration and there is a significant advantage in doing so. The guidance laws (1) are more compatible with the seeker measurements which are angular in nature, (2) do not require an estimate of time-to-go, (3) can be used to directly drive the skid-to-turn or bank-to-turn logic that produces autopilot input commands, (4) avoid actuator saturation through the real-time adjustment of a single parameter in each channel, and (5) are less sensitive to random errors. Thus these guidance laws are not only effective in and of themselves, but also provide a simple framework within which an integrated guidance and control design can be carried out. The integrated design accounts for interactions between the target state estimator, the guidance law, and the autopilot during the design process.

3 Claims, 2 Drawing Sheets

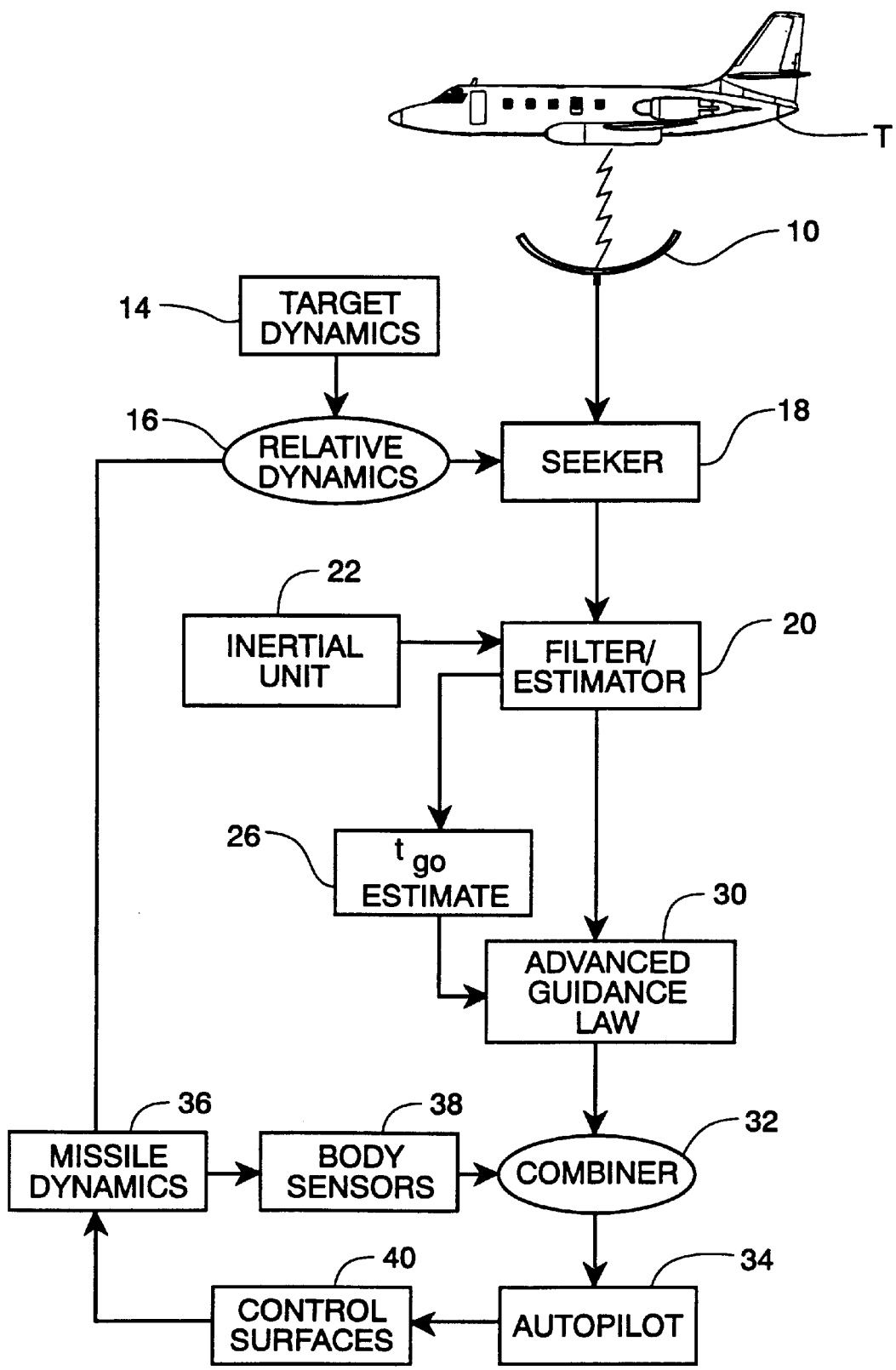
Fig. 1 Air-to-air missile block diagram

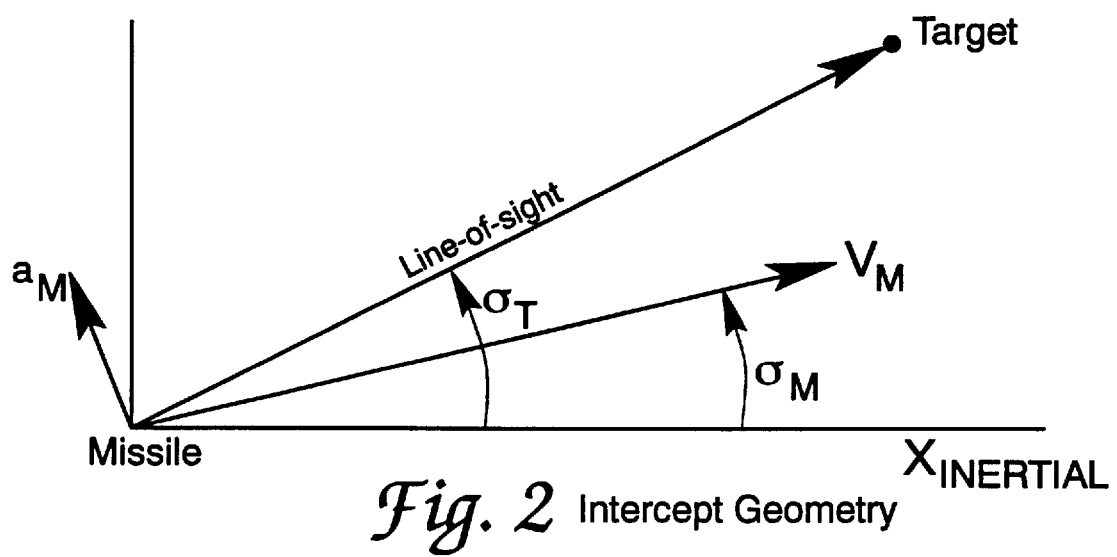
*Fig. 2* Intercept Geometry

PROPORTIONAL GUIDANCE (PROGUIDE) AND AUGMENTED PROPORTIONAL GUIDANCE (AUGMENTED PROGUIDE)

RIGHTS OF THE GOVERNMENT

The invention described herein may be manufactured and used by or for the Government of the United States for all governmental purposes without the payment of any royalty.

BACKGROUND OF THE INVENTION

The present invention relates generally to missile guidance.

The traditional approach to missile guidance is to use Proportional Navigation (PRONAV). PRONAV was developed by C. Yuan at RCA Laboratories during World War II using physical intuition [1]. The resulting simplistic guidance law states that the commanded linear acceleration $\alpha_c$ is proportional to the line-of-sight (LOS) rate $\dot{\sigma}_T$. The proportionality constant can be broken down into the product of the effective navigation ratio N times the relative missile-target closing velocity Vc, $$a_c = NV_c \dot{\sigma}_T \qquad (1)$$

Two decades later, the quasi-optimality of PRONAV was derived [2]. The prefix quasi is used here because of all the assumptions that must be made in deriving PRONAV as a solution of a linear-quadratic optimal control problem [3]. These assumptions are as follows:

1. The target has zero acceleration.
2. The missile has perfect response and complete control of its acceleration vector.
3. The missile is launched on a near collision course such that the line-of-sight (LOS) angles remain small over the entire engagement.
4. The missile has zero acceleration along the LOS over all time.

Since all these assumptions are violated in a typical air-to-air intercept scenario, PRONAV is not realistically an optimal guidance law. In an attempt to account for target acceleration (avoid using the first assumption), an additional term is added to the basic PRONAV equation. The additional term is simply the target's estimated acceleration $a_T$ multiplied by a proportionality coefficient K. This coefficient is a function of time-to-go, which is defined as the time remaining to missile impact or detonation. The resulting guidance law, known as Augmented PRONAV is given in its general form as $$a_c = NV_c \dot{\sigma}_T + K a_T \qquad (2)$$

There are two main reasons that so many assumptions have to be made in relating PRONAV to a linear-quadratic optimal control formulations. First, PRONAV mixes a translational quantity, commanded linear acceleration $\alpha_c$ with an angular quantity, line-of-sight rate $\dot{\sigma}_T$. This results in non-linear dynamics in the associated optimal control problem. Second, PRONAV attempts to directly minimize miss distance, which requires having to estimate time-to-go. A consistently accurate estimate of time-to-go cannot be obtained in a maneuvering target scenario, since the target's future motion is unknown.

These negative characteristics of PRONAV motivated the development of the guidance laws presented herein.

The following United States patents are of interest.

5,168,277—LaPinta et al
5,062,056—et al
5,035,375—Friedenthal et al
4,993,662—Barnes et al
4,980,690—Fiden
4,959,800—Woolley
4,825,055—Pollock
4,719,584—Rue et al
4,568,823—Dielh et al
4,402,250—Baasch
4,162,775—Voles None of the cited patents disclose Proportional Guidance and/or Proportional Guidance and Augmented Proportional Guidance which are based on two guidance law algorithms. The patent to Pollock discloses the use of a trajectory correction algorithm for object tracking. The remaining patents describe a variety of different tracking methods which are of less interest.

The following prior publications are of interest.

Yuan, C. L., "Homing and Navigation Courses of Automatic Target-Seeking Devices," RCA Labs, Princeton, N.J., Report PTR-12C, December 1942.

Yuan, C. L., "Homing and Navigation Courses of Automatic Target-Seeking Devices," Journal of Applied Physics, Vol. 19, December 1948, pp. 1122–1128.

Fossier, M. W., "The Development of Radar Homing Missiles," Journal of Guidance, Control, and Dynamics, Vol. 7, November–December 1984, pp. 641–651, Riggs, T. L. and Vergez, P. L., "Advanced Air-to-Air Missile Guidance Using Optimal Control and Estimation," USAF Armament Laboratory, AFATL-TR-81-52, June 1981.

Zarchan, P., *Tactical and Strategic Missile Guidance*, Volume 124, Progress in Astronautics and Aeronautics, Published by the American Institute of Aeronautics and Astronautics, Inc., Washington D.C.

SUMMARY OF THE INVENTION

An objective of the invention is to increase the single-shot kill probability of tactical guided weapons via a revolutionary guidance technique.

The invention relates to two guidance law algorithms which direct tactical weapons to intercept against non-maneuvering and maneuvering targets, respectively. The innovation in these algorithms is that they command the achievement of angular acceleration instead of linear acceleration. With Proportional Guidance (PROGUIDE), the commanded angular acceleration is proportional to the difference between the scaled line-of-sight rate and the missile velocity vector's angular rate. With Augmented Proportional Guidance (Augmented PROGUIDE), an additional term is added to PROGUIDE which accounts for line-of-sight angular acceleration due to target maneuvering. Both of these guidance laws are optimal guidance laws in that they are the solutions of linear-quadratic regulator control problems and minimize deviations from the collision triangle over the entire period of homing flight, thereby indirectly minimizing miss distance. The guidance laws are (1) more compatible with the seeker measurements which are angular in nature, (2) do not require an estimate of time-to-go, (3) can be used to directly drive the skid-to-turn or bank-to-turn logic that produces autopilot input commands, (4) avoid actuator saturation through the real-time adjustment of a single parameter in each channel, and (5) are less sensitive to random errors.

BRIEF DESCRIPTION OF THE DRAWING

FIG. 1 is a typical air-to-air missile block diagram; and

FIG. 2 is a diagram showing intercept geometry.

DETAILED DESCRIPTION

The invention is disclosed in a WL/MN Interim Report dated May 1993, to the advanced medium range air-to-air missile (AMRAAM) System Program Office, titled "Bank-To-Turn In-House Control Study", with limited distribution authorized for May 17, 1993. A copy of the report is included herewith as part of the application as filed, and is hereby incorporated by reference.

Perhaps the most challenging of all guidance and control problems is that of a modern tactical air-to-air missile in pursuit of a highly maneuverable aircraft. The problem consists of the estimation of target motion, the generation of guidance commands to optimally steer the missile toward target intercept, and the control of the coupled, nonlinear, multivariable, uncertain dynamics of the air-to-air missile. Each portion of the problem, i.e., estimation, guidance, and control, is inherently nonlinear and time varying, and all three combine to form a highly complex integrated system.
Block Diagram of Typical Guided Missile System (See FIG. 1)

A simplified block diagram of an advanced air-to-air missile system is given in FIG. 1. The units 10–40 are included in a guided missile which is in pursuit of a target aircraft T. The missile uses a seeker 18 (which includes an active radar unit having transmitter and receiver circuits) coupled to an antenna 10 to track the target T. The seeker 18 senses the relative dynamics between the target and the missile, as represented by blocks 14, 36 and 16.

Target information obtained from the seeker 18 is processed by a modern estimation filter 20, such as an extended Kalman filter, to obtain estimates of relative missile-to-target position, velocity, and acceleration. These filtered estimates are heavily dependent on an assumed target acceleration model. Input to the filter/estimator 20 is also provided from an inertial navigation unit 22, which processes data obtained from gyroscopes and accelerometers. A guidance law based on modern control theory uses the state estimates and an estimate of time-to-go until intercept to produce a commanded acceleration. The guidance law is implemented using a microprocessor in unit 30, with input from the filter/estimator 20, and the time-to-go estimator 26. Data from the guidance law unit 30 and the body sensors unit 38 are combined at block 32 and supplied to an autopilot 34.

The autopilot 34 converts the commanded input into fin commands for actuators of the control surface represented by block 40, based on airframe aerodynamic characteristics and sensed missile body angular rates and linear acceleration. The resulting motion produces new missile dynamics in unit 36, which closes the three feedback loops.
PROGUIDE and Augmented PROGUIDE Two new homing guidance laws, designated as proportional Guidance (PROGUIDE) and Augmented Proportional Guidance (Augmented PROGUIDE), have been developed for use against non-maneuvering and maneuvering targets, respectively. These guidance laws (which may be implemented in the microprocessor in unit 30 of FIG. 1, or in many other systems) are the solutions of linear-quadratic regulator control problems and minimize deviations from the collision triangle over the entire period of homing flight, thereby indirectly minimizing miss distance. In contrast to proportional navigation (PRONAV), these algorithms command the achievement of angular acceleration instead of linear acceleration and there is a significant advantage in doing so. The guidance laws (1) are more compatible with the seeker measurements which are angular in nature, (2) do not require an estimate of time-to-go, (3) can be used to directly drive the skid-to-turn or bank-to-turn logic that produces autopilot input commands, (4) avoid actuator saturation through the real-time adjustment of a single parameter in each channel, and (5) are less sensitive to random errors. Thus these guidance laws are not only effective in and of themselves, but also provide a simple framework within which an integrated guidance and control design can be carried out. The integrated design accounts for interactions between the target state estimator, the guidance law, and the autopilot during the design process.

The Proportional Guidance (PROGUIDE) algorithm is derived by directly minimizing deviations from the collision triangle over the entire homing flight of the weapon. By using such strategy, PROGUIDE indirectly minimizes miss distance and does not require an estimate of time-to-go. In contrast to PRONAV, PROGUIDE commands angular acceleration instead of linear acceleration. The commanded angular acceleration is proportional to the difference between the scaled LOS rate $K_1 \dot{\sigma}_T$ and the missile velocity vector's angular rate $\dot{\sigma}_M$ (see FIG. 2). Mathematically, PROGUIDE is given as $$\ddot{\sigma}_M = K_2(K_1 \dot{\sigma}_T - \dot{\sigma}_M) \quad (3)$$

where the factor $K_1$ is used as a damping coefficient and $K_2$ is a response lag tuning coefficient (to be discussed later).

Proportional guidance is the solution of a linear-quadratic regulator problem. The problem is as follows:
Minimize $$x^T Q x + R u^2 dt \quad (4)$$

with respect to the states $x_1$ and $x_2$ and control u subject to $$\dot{x} = Ax + Bu \quad (5)$$

where $$x = \begin{bmatrix} x_1 \\ x_2 \end{bmatrix} \quad A = \begin{bmatrix} 0 & 1 \\ 0 & 0 \end{bmatrix} \quad B = \begin{bmatrix} 0 \\ -1 \end{bmatrix} \quad Q = \begin{bmatrix} 0 & 0 \\ 0 & 1 \end{bmatrix} \quad R = \frac{1}{K_2^2} \quad (6)$$

and where $$x_1 = K_1 \sigma_T - \sigma_M \quad x_2 = K_1 \dot{\sigma}_T - \dot{\sigma}_M \quad (7)$$

$$u = \ddot{\sigma}_M \quad \ddot{\sigma}_T = 0 \quad (8)$$

Here $\sigma_T$ is the LOS angle, $\dot{\sigma}_T$ is the LOS rate, $\dot{\sigma}_M$ is the angular rate-of-change of the missile's velocity vector, and $\ddot{\sigma}_M$ is the angular acceleration of the missile's velocity vector. In contrast to the derivation of PRONAV where it is assumed that the target's linear acceleration is zero, here it is assumed that the target's relative acceleration, i.e., the LOS vector's angular acceleration $\ddot{\sigma}_T$, is zero.

Using Equations (6), (7) and (8), the performance index (4) can be rewritten as $$\int_0^\infty (K_1 \dot{\sigma}_T - \dot{\sigma}_M)^2 + \frac{1}{K_2^2} \ddot{\sigma}_M^2 \, dt \quad (9)$$

A non-zero value of the second state $x_2 = K_1 \dot{\sigma}_T - \dot{\sigma}_M$ represents a deviation from the collision triangle. The performance index states that we would like to minimize any such deviation over the entire intercept encounter, while simultaneously limiting the control activity represented by the second term in Equation (9). At some point between 0 and infinity, intercept or detonation will occur. However, we do not need to know the time of that event, since prior to that event we are constantly reestablishing the collision triangle. This strategy indirectly results in the achievement of minimum miss distance.

It is well known that the solution of the problem represented by Equations (4) through (8) is given by $$u^* = -R^{-1}B^T P_x \tag{10}$$

where P is the solution of the algebraic Riccati equation $$AP + A^T P - PBR^{-1}B^T P + Q = 0 \tag{11}$$

Substituting the analytical solution of the Riccati equation (11) into the optimal feedback law (10) yields the optimal PROGUIDE law (3).

Relationship between Basic PROGUIDE and Basic PRONAV

Assuming constant missile velocity, it can be shown that PROGUIDE is a differential down from PRONAV and accounts for response lag. If a first order lag is imposed on the PRONAV law (1), then the guidance law becomes $$a_c = \frac{N V_c \dot{\sigma}_T}{1 + \tau s} \tag{12}$$

where s is a differential operator. For a constant velocity missile, $$a_c = V_M \dot{\sigma}_M \tag{13}$$

so that $$(1 + \tau s) V_M \dot{\sigma}_M = N V_c \dot{\sigma}_T \tag{14}$$

which yields $$\ddot{\sigma}_M = \frac{1}{\tau}\left[\frac{N V_c \dot{\sigma}_T}{V_m} - \dot{\sigma}_M\right] \tag{15}$$

By selecting $K_1$ and $K_2$ such that $$K_1 = N \frac{V_c}{V_m} \qquad K_2 = \frac{1}{\tau} \tag{16}$$

the PROGUIDE law (3) becomes the first-order lagged PRONAV law (12). Thus, PROGUIDE has a response lag tuning parameter $K_2$ which can be tuned to account for the autopilot/airframe response time.

Augmented Proportional Guidance

The augmented proportional guidance algorithm (Augmented PROGUIDE) is derived by assuming that the target's relative angular acceleration is non-zero and can be modeled as a first-order Markov process. The optimal control formulation in this case is:

Minimize $$x^T Q x + R u^2 dt \tag{17}$$

with respect to the states $x_1$, $x_2$, and $x_3$ and the control u subject to $$\dot{x} = Ax + Bu \tag{18}$$

where $$x = \begin{bmatrix} x_1 \\ x_2 \\ x_3 \end{bmatrix} \quad A = \begin{bmatrix} 0 & 1 & 0 \\ 0 & 0 & K_1 \\ 0 & 0 & -\lambda \end{bmatrix} \quad B = \begin{bmatrix} 0 \\ -1 \\ 0 \end{bmatrix} \tag{19}$$

$$Q = \begin{bmatrix} 0 & 0 & 0 \\ 0 & 1 & 0 \\ 0 & 0 & 0 \end{bmatrix} \quad R = \frac{1}{K_2^2} \tag{20}$$

and where $$x_1 = K_1 \sigma_T - \sigma_M \quad x_2 = K_1 \dot{\sigma}_T - \dot{\sigma}_M \quad x_3 = \dot{\sigma}_T \tag{21}$$

$$u = \ddot{\sigma}_M \tag{22}$$

Using equations (20) through (22), it can easily be shown that the performance index (17) is equivalent to (9). The optimal solution of this control problem can be obtained by substituting the result into the optimal feedback law (10). This leads to the optimal Augmented PROGUIDE law.

$$\ddot{\sigma}_M = K_2(K_1 \dot{\sigma}_T - \dot{\sigma}_M) + \frac{K_1 K_2}{\lambda + K_2} \ddot{\sigma}_T \tag{23}$$

where $\lambda$ is the inverse time constant of the target's relative angular maneuver. It is interesting to look at the case where $K_1 = 1$ and the target has constant relative angular acceleration ($\lambda = 0$). In this case Augmented PROGUIDE reduces to $$\ddot{\sigma}_M = K_2(\dot{\sigma}_T - \dot{\sigma}_M) + \ddot{\sigma}_T \tag{24}$$

Eq. (24) states that if there is any deviation from the collision triangle caused by relative angular target acceleration (i.e., angular LOS acceleration $\ddot{\sigma}_T$), the angular acceleration $\ddot{\sigma}_M$ of the missile's velocity vector must not only account for the resulting angular velocity difference that appears in the first term, but must additionally keep up with the continuing constant angular acceleration of the target represented by the second term. This is a nice geometric results which confirms intuition.

ADVANTAGES and NEW FEATURES

The new features of these guidance laws are that they command angular acceleration instead of linear acceleration and do not require an estimate of time-to-go. Additionally, in Augmented PROGUIDE the target's acceleration is accounted for in the form of relative angular acceleration.

There are many advantages of PROGUIDE and Augmented PROGUIDE over PRONAV and its variants. First, these guidance algorithms are exact solutions of linear-quadratic optimal control problem formulations and are, therefore, optimal guidance laws.

Second, while the damping coefficient $K_1$ may require scheduling as a function of instantaneous range rate (see Eq. (16)), there is a big difference between such a requirement and the requirement to estimate time-to-go. In the former case, an accurate estimate of range rate produces the proper scheduling of $K_1$. However, in the latter case, even perfect knowledge of instantaneous range and range rate could produce a very poor estimate of time-to-go in a maneuvering target scenario, thus making it difficult to properly schedule K in the Augmented PRONAV law (2).

Third, PROGUIDE and Augmented PROGUIDE are capable of attenuating uncompensated random effects which appear as an additive error in the commanded angular acceleration. To illustrate this, let $\xi_1$ and $\epsilon_2$ be errors in the line-of-sight acceleration $\ddot{\sigma}_T$ and line-of-sight $\dot{\sigma}_T$, respectively, due to random effects. Note that $\epsilon_1$ and $\epsilon_2$ are not independent. These errors appear in Eq. (23) as $$\ddot{\sigma}_M = K_2[K_1(\dot{\sigma}_T + \epsilon_2) - \dot{\sigma}_M] + \frac{K_1 K_2}{\lambda + K_2}(\ddot{\sigma}_T + \epsilon_1)$$

$$= K_2(K_1\dot{\sigma}_T - \dot{\sigma}_M) + \frac{K_1 K_2}{\lambda + K_2}\ddot{\sigma}_T + K_1 K_2\left(\frac{\epsilon_1}{\lambda + K_2} + \epsilon_2\right)$$

$$= \ddot{\sigma}_{M_{line}} + \epsilon_3$$

where $$\epsilon_3 = K_1 K_2\left(\frac{\epsilon_1}{\lambda + K_2} + \epsilon_2\right) \quad (26)$$

PROGUIDE provides for the natural filtering of these additive high frequency errors, whereas PRONAV does not. This is due to the fact that PROGUIDE is a differentiation down from PRONAV. Thus, there is a physical integration that must take place (the generation of a new angular velocity $\dot{\sigma}_M$ due to the achieved angular acceleration $\ddot{\sigma}_M$) before an equivalent linear acceleration ($V_M\dot{\sigma}_M$) is achieved. This physical integration represents a low-pass filtering operation. Hence, PROGUIDE and Augmented PROGUIDE should be less sensitive to high frequency errors that PRONAV (as well as other guidance laws which command linear acceleration) in terms of the achievement of desired linear acceleration.

Fourth, PROGUIDE and Augmented PROGUIDE are highly compatible with skid-to-turn control as well as bank-to-turn control, since both forms of control are angular in nature. The advantage of PROGUIDE over PRONAV with regard to bank-to-turn control is especially significant. Since PRONAV commands linear acceleration and does not account for response lag, in order to achieve the desired acceleration using coordinated bank-to-turn control, the missile must roll about its velocity vector until its preferred maneuver plane is coincident with the commanded acceleration. In doing so, there must be an initial phase of roll acceleration, perhaps some period of sustained roll rate, and a final phase of roll deceleration until the desired bank angle is attained. How this is accomplished is totally ad hoc, decided upon by the design engineer. Thus, aside from the final bank angle, this rolling maneuver is totally disassociated from the guidance law. In other words, PRONAV and other guidance laws which command linear acceleration do not drive the bank-to-turn logic.

In contrast, inspection of Eq(3) reveals that when there is a difference between the scaled LOS rate and the angular rate of the missile's velocity vector, PROGUIDE issues an angular acceleration command until the missile velocity vector's angular rate $\dot{\sigma}_M$ cancels the scaled LOS rate $K_1\dot{\sigma}_T$. Once the angular acceleration command goes to zero, however, the missile body still has angular momentum. As the missile continues to turn, the LOS rate will decrease, resulting in an angular deceleration command from the guidance law. This process will continue until the LOS rate is zeroed out.

As this entire process is occurring, the commanded angular acceleration $\ddot{\sigma}_M$ can be converted to the body-related angular accelerations $\alpha$, $\beta$, $\dot{p}$, $\dot{q}$ and $\dot{r}$ (angle-of-attack acceleration, side-slip acceleration, and roll, pitch, and yaw accelerations), to be used as commanded inputs to the autopilot. As the commanded angular acceleration increases, the body-related angular acceleration commands increase; when the commanded angular acceleration goes to zero, sustained body-related rates are issued; and when the sign of the commanded angular acceleration reverses, body-related angular deceleration commands are issued. Thus, there is no ad hoc design influence in the autopilot's commanded input. PROGUIDE drives the bank-to-turn logic.

Fifth, the compatibility between (Augmented) PROGUIDE, the autopilot command logic, and the autopilot allows actuator saturations to be addressed in a direct manner. The actuators will saturate when body angular accelerations are commanded beyond which the actuators and fins are capable of inducing. This undesirable condition can be avoided by scaling back these commands. Since the autopilot command logic is driven by PROGUIDE, this can be achieved by simply reducing the commanded inertial angular accelerations. This in turn can be achieved by reducing the value of the response lag coefficient $K_2$. Thus, actuator saturation can be avoided (at the expense of a slightly slower missile response time) through the real-time adjustment of a single parameter in each guidance channel.

Finally, if all the above advantages are taken collectively, PROGUIDE and Augmented PROGUIDE provide a simple framework within which an integrated guidance and control design can be carried out. The integrated design accounts for the interactions between the target state estimator, the guidance law, and the autopilot during the design process.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A guided missile system using Proportional Guidance (PROGUIDE), wherein a guidance law algorithm directs tactical weapons to intercept against non-maneuvering targets, comprising means for commanding the achievement of angular acceleration, with commanded angular acceleration proportional to the difference between scaled line-of-sight rate and a missile velocity vector's angular rate;

and means comprising an additional term which is added to PROGUIDE to account for line-of-sight angular acceleration due to target maneuvering;

whereby the guidance law is an optimal guidance law in that it is a solution of linear-quadratic regulator control problem and minimizes deviations from a collision triangle over an entire period of homing flight, thereby indirectly minimizing miss distance.

2. A guided missile system using Proportional Guidance (PROGUIDE), wherein a guidance law algorithm directs a missile to intercept against a non-maneuvering target, comprising means for commanding the achievement of angular acceleration, with commanded angular acceleration $\ddot{\sigma}_M$ proportional to the difference between scaled line-of-sight rate $K_1\dot{\sigma}_T$ and the missile velocity vector's angular rate $\dot{\sigma}_M$, given as $$\ddot{\sigma}_M = K_2(K_1\dot{\sigma}_T - \dot{\sigma}_M)$$

where the factor $K_1$ is used as a damping coefficient and $K_2$ is a response lag tuning coefficient;

and means comprising an additional term which is added to PROGUIDE to account for line-of-sight angular acceleration due to target maneuvering; given as $$\ddot{\sigma}_M = K_2(K_1\dot{\sigma}_T - \dot{\sigma}_M) + \frac{K_1 K_2}{\lambda + K_2}\ddot{\sigma}_T$$

where $\lambda$ is the inverse time constant of the target's relative angular maneuver;

whereby the guidance law is an optimal guidance law in that it is a solution of linear-quadratic regulator control problems and minimizes deviations from a collision triangle over an entire period of homing flight, thereby indirectly minimizing miss distance.

3. A guided missile system according to claim 7, wherein $K_1=1$ and the target has constant relative angular acceleration ($\lambda=0$), and Augmented PROGUIDE reduces to $$\ddot{\sigma}_M = K_2(\dot{\sigma}_T - \dot{\sigma}_M) + \ddot{\sigma}_T$$

which states that if there is any deviation from the collision triangle caused by relative angular target acceleration (i.e., angular LOS acceleration $\sigma_T$), the angular acceleration $\sigma_M$ of the missile's velocity vector must not only account for the resulting angular velocity difference that appears in the first term, but must additionally keep up with the continuing constant angular acceleration of the target represented by the second term.

* * * * *